UNITED STATES PATENT OFFICE.

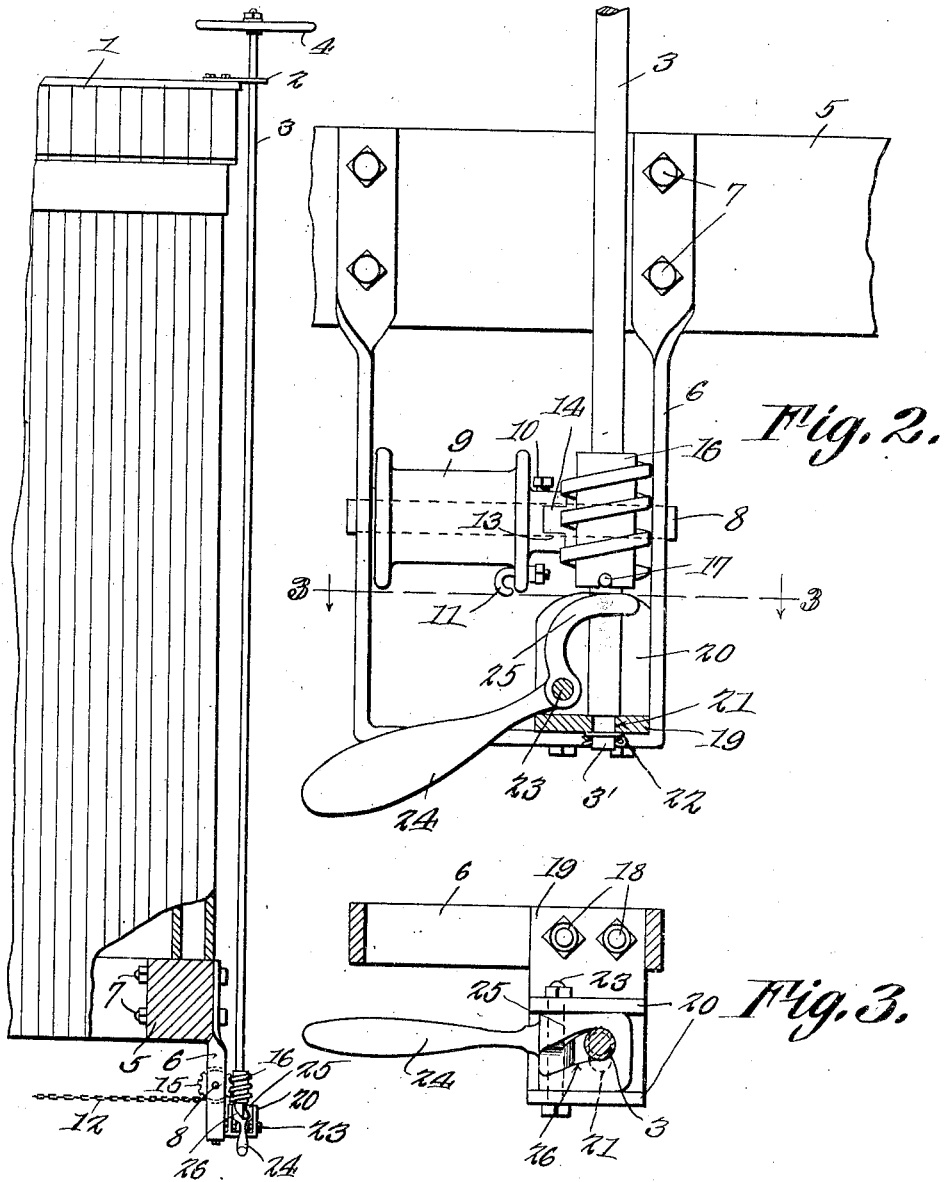

JOHN D. COMPTON, OF INDIANAPOLIS, INDIANA.

BRAKE-OPERATING MECHANISM.

1,307,484.  Specification of Letters Patent.  Patented June 24, 1919.

Application filed April 23, 1918. Serial No. 230,345.

*To all whom it may concern:*

Be it known that I, JOHN D. COMPTON, a citizen of the United States, residing at Indianapolis, in the county of Marion and State of Indiana, have invented a new and useful Improvement in Brake-Operating Mechanism, of which the following is a specification.

The subject of the present invention is a brake operating mechanism intended, primarily, for use on freight cars, though applicable to any car on which brakes are used.

A main object of the invention is the provision of means for releasing the brake from beside the car.

Another object of the invention is the provision of a brake operating mechanism which may be released without danger to the operator.

The invention also contemplates the provision of a brake operating mechanism which may be applied to the present and usual equipment of a car.

A still further object of the invention is to generally improve the construction and enhance the utility of brake operating mechanism.

With the brake operating mechanism at present in general use on freight cars, if the brake is set by air, or by one stronger than the brakeman who attempts to release the brake, either the brakeman can not release the brake without breaking the dog, or he runs the risk of being thrown from the car or otherwise injured by the sudden spinning of the hand wheel when the dog is released. It is to overcome these difficulties that the present invention is devised.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in side elevation of a box car end, a portion thereof in section, with a brake operating mechanism constructed in accordance with the invention in place thereon;

Fig. 2 is an enlarged, fragmentary detail view of the operating mechanism, the view being in front elevation with a portion in section;

Fig. 3 is a sectional view on the line 3—3 of Fig. 2.

Referring to the drawing by numerals of reference:—

A box car or freight car is shown at 1, and projecting from the end of the car, to the top of which it is attached in any suitable manner, is a loop 2 which acts as a support for the upper end of the rod 3. The loop loosely encircles the rod 3 for the purpose of allowing the rod sufficient play. The hand wheel 4 is rigid on the upper end of the rod 3 and may be manually rotated to tighten or loosen the brakes of the car.

The car is formed with the usual end sill 5 from which depends an ordinary supporting yoke 6, which yoke is attached to the sill by means of bolts 7 or in any other suitable manner. A pin or shaft 8 is journaled in apertures formed in the side bars of the inverted supporting yoke 6, and upon this shaft, within the yoke, is mounted a drum 9 which is clamped to the shaft to rotate therewith by means of a set screw 10 or otherwise. The drum is provided with a hook 11, or other attaching means, by which one end of a chain 12 may be secured to the drum, the other end of the chain being attached to the brake beam in the usual manner. The drum 9 has extending from one end thereof a clutch element 13 which is adapted to engage with a similar clutch element 14, formed on the hub of a worm wheel 15 which is loosely mounted on the shaft 8 and which is constrained to rotate with the shaft by reason of the engagement of the clutch elements. The object in making the drum and the worm gear separate elements is to permit easy replacement of parts should one or the other become broken.

A worm 16 is mounted on the shaft 3 to which it is secured by a pin 17 or otherwise, and this worm meshes with the worm wheel 15 under normal conditions. As will be understood, the object of the worm is to rotate the worm wheel and drum through rotation of the rod 3, and thereby cause operation of the brake.

Secured to the cross bar of the supporting yoke 6, by means of bolts 18 or otherwise, is a bracket 19, formed at its outer end with spaced upstanding supporting members 20. A slot 21 is formed in the arm of the bracket 19, between the members 20, and extends longitudinally of the arm. This slot receives the reduced lower end 3' of the rod 3 with a close sliding fit, and the annular shoulder formed by the reduction of the rod 3 rests upon the arm of bracket 19 beside the slot 21. The reduced end 3' may be apertured to receive a pin 22 which is positioned below the bracket arm 19 and serves to hold the rod 3 against upward movement.

The spaced members 20 of the bracket arm 19 are apertured to receive a pin 23 upon which is fulcrumed a lever, one arm of which, indicated by the numeral 24, is weighted to hold that arm normally in lowered position, while the other arm, 25, which is normally held in elevated position by the weighted arm 24, is broadened and curved and has a cam slot 26 formed therein. The rod 3 passes through this slot 26 and the slot is so formed that, when the lever is in normal position, the lower end of the rod 3 is thrown to the inner end of the slot 21 and, consequently, the worm 16 is held in mesh with the worm wheel 15. By lifting the lever arm 24, the lower end of the rod 3 will be thrown to the outer end of the slot 21 and the worm and worm wheel thrown out of gear or mesh. As will be understood, throwing these gears out of mesh will release the brakes.

The lever is supported transversely of the car so that jolting of the car will not have any other effect thereon than to keep it in its normal position. It is also easier for the lever arm 24 to be reached from the side of the car without entering between the cars, which is often dangerous when releasing brakes.

From a consideration of Fig. 3 it will be seen that, when the rod 3 is rotated to set the brakes, the slope of the slot 26 is such that the tendency of the lever will be to remain in normal position as the frictional contact between the side of the slot and the rod during such rotation of the rod, tends to raise the arm 25 of the lever.

Having thus described the invention, what is claimed as new and sought by Letters Patent, is:—

1. The combination with a car structure and a yoke fixedly connected to one end thereof and depending therefrom, of a shaft journaled in the yoke, a winding drum thereon, a worm wheel secured to the shaft, a manually operated shaft mounted on the car structure and having its lower end mounted for sliding movement within the yoke, a worm upon said shaft, a lever fulcrumed in the yoke and having a cam slot through which the shaft extends, said lever being provided with a weighted end for holding the cam slot normally positioned to maintain the worm in engagement with the wheel.

2. The combination with a car structure and a yoke fixedly connected to one end thereof and depending therefrom, said yoke having a slot therein, of a shaft journaled in the yoke, a winding drum secured thereto, a worm wheel secured to said shaft, a brake applying element connected to and adapted to wind upon the drum, a manually operated shaft mounted on the car structure and having a reduced lower end mounted for sliding movement within the slot in the yoke, a lever fulcrumed in the yoke and having a cam slot in one end through which the manually operated shaft extends, and a weight at the other end of the lever for maintaining said slot normally positioned to hold the manually operated shaft at one end of its slot, and a worm upon said shaft and normally meshing with the wheel, said shaft being shiftable in its slot by the actuation of the lever to disengage the worm from the wheel.

In testimony that I claim the foregoing as my own, I have hereto affixed my signature in the presence of two witnesses.

JOHN D. COMPTON.

Witnesses:
Ivy E. Simpson,
Wm. N. Roach, Jr.